United States Patent
Reibold

(10) Patent No.: US 8,718,888 B2
(45) Date of Patent: May 6, 2014

(54) METHOD FOR ADAPTING A CLUTCH CHARACTERISTIC CURVE WHEN CLUTCH HYSTERESIS IS PRESENT

(75) Inventor: Ekkehard Reibold, Lahr (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1452 days.

(21) Appl. No.: 12/214,709

(22) Filed: Jun. 20, 2008

(65) Prior Publication Data

US 2009/0000901 A1 Jan. 1, 2009

(30) Foreign Application Priority Data

Jun. 25, 2007 (DE) .......................... 10 2007 029 209

(51) Int. Cl.
*F16D 13/46* (2006.01)
*G06F 17/00* (2006.01)
*G06F 19/00* (2011.01)

(52) U.S. Cl.
USPC ...................................... 701/68; 192/70.252

(58) Field of Classification Search
USPC ............. 701/1, 29, 30, 34–36, 51, 55, 56, 58, 701/60, 66–68, 29.1, 32.1; 192/70.252, 192/85.63, 84.6
See application file for complete search history.

(56) References Cited

U.S. PATENT DOCUMENTS

| | | | | |
|---|---|---|---|---|
| 5,993,352 A | * | 11/1999 | Kosik et al. | ...................... 477/74 |
| 7,158,873 B2 | * | 1/2007 | Eich et al. | ...................... 701/68 |
| 2002/0128763 A1 | | 9/2002 | Jager et al. | |
| 2004/0064232 A1 | * | 4/2004 | Eich et al. | ...................... 701/68 |

FOREIGN PATENT DOCUMENTS

EP 1418083 5/2004

* cited by examiner

*Primary Examiner* — Thomas Tarcza
*Assistant Examiner* — Edward Pipala
(74) *Attorney, Agent, or Firm* — Davidson, Davidson & Kappel, LLC

(57) ABSTRACT

A method for adapting a clutch characteristic curve, in particular one that exhibits hysteresis, where at least one characteristic value obtainable from the characteristic curve is compared to an appropriately measured characteristic value, and if the comparison shows that there is a deviation between the two characteristic values which is greater than a predetermined value, an adjustment is made to the clutch characteristic curve.

10 Claims, 1 Drawing Sheet

METHOD FOR ADAPTING A CLUTCH CHARACTERISTIC CURVE WHEN CLUTCH HYSTERESIS IS PRESENT

This claims the benefit of German Patent Application No. 10 2007 029 209.2 filed on Jun. 25, 2007, and hereby incorporated by reference herein.

The present invention relates to a method for adapting a clutch characteristic curve.

BACKGROUND

In vehicles with one or more automated clutches, regardless of whether the transmission is likewise automated, the clutch behavior is often modeled by software and is adapted at frequent intervals during driving operation. This permits the clutch to be actuated in such a way that the expectations of comfort and convenience from an automated clutch are met.

Clutch characteristic curves are often used for controlling automated clutches. Such clutch characteristic curves are representations of the torque transmissible by the clutch or clutches over the position of the actuator that disengages and/or engages the clutch. By means of such depictions, the torque transmissible by the clutch can be deduced from the position of the clutch actuator, or the position of the actuator can be deduced from the torque transmissible by the clutch.

Some of the clutch models also take dependencies on the clutch temperature into account, since that can lead to deformation of the clutch. A change in the clutch temperature can also lead to a change in the friction coefficient of the clutch lining.

Also considered are the engine speed, since high speeds of rotation can lead to centrifugal force effects, and also the slip speed, whose dependence is conditioned by the fluid in wet clutches.

However, clutches frequently exhibit hysteresis. Hence the torque transmissible by the clutch varies in magnitude, depending on whether the clutch is being disengaged or engaged at the time.

If allowance is not made for such hysteresis, this increases the scattering in the adaptive parameters of the clutch model. That causes the mean error in the clutch torque setting to rise, which can result in a reduction of driving comfort.

SUMMARY OF THE INVENTION

An object of the present invention provides a method that is suitable for adapting a clutch characteristic curve to the behavior of a clutch that exhibits hysteresis.

An embodiment of the present invention provides a method for adapting a clutch characteristic curve, in particular one that exhibits hysteresis, where at least one characteristic value obtainable from the characteristic curve is compared to an appropriately measured characteristic value, and if the comparison shows that there is a deviation between the two characteristic values which is greater than a predetermined value, an adjustment is made to the clutch characteristic curve.

An objective of the present invention provides a method to generate a clutch characteristic curve that may be adapted to the two hysteresis branches of the actual clutch behavior, and preferably falls between the two hysteresis branches. That can eliminate the need to consider the past when using the clutch characteristic curve, and thus also the need to consider additional parameters when determining the actuator position and/or the transmitted torque, such as for example whether the clutch is being disengaged or engaged at the time.

On the other hand, an attempt may be made to preserve a characteristic curve that may be as precise a depiction as possible of the actual clutch behavior, because in that way the scatter of the adaptive parameters and thus the mean error in the clutch torque setting can be kept small.

This may be accomplished by not considering all deviations of the measured characteristics from the characteristics obtained from the characteristic curve when adapting the clutch characteristic curve. If the deviations are very small, it can be assumed that the deviation comes from the hysteresis in the clutch behavior and that no adaptation of the clutch characteristic curve may be necessary.

However, if the deviation between the measured characteristic and the characteristic from the existing characteristic curve is greater than a certain value, then it can be assumed that the existing characteristic curve may not be optimally adapted to the real clutch behavior and that an additional adaptation may be necessary.

The invention is by no means limited to measuring and/or calculating a particular characteristic value, but it may be advantageous if the forenamed measured characteristic may be the torque transmissible by the clutch. Thus the maximum torque that can be transmitted by the clutch in the position of the clutch may be measured. This may be possible in particular if the maximum torque is transmitted, for example, the clutch exhibits slippage. The torque then transmissible by the clutch can then be calculated from the behavior of the drive engine or from the vehicle acceleration and/or velocity.

The characteristic value can also be the engine speed. To that end it may be assumed that the engine speed may be dependent on the torque transmitted through the clutch. If the clutch exhibits slippage, then the torque being transmitted by the clutch may be equal to the maximum torque transmissible in the present torque situation. If the torque produced by the engine is known, then the change in the speed of rotation can be used to conclude how high the maximum transmissible torque may be. The change in engine speed may be easy to obtain, for example using a tachometer.

In general it is possible to draw on a large number of different comparisons between the measured characteristic values and those obtained from the characteristic curve to adapt the characteristic curve, in a particularly advantageous embodiment of the invention, a difference between the measured value and that obtained from the characteristic curve may be calculated. On the one hand the formation of the difference may be linear, so that it may be easily obtained by analysis, and on the other hand it can be inserted without complication into an existing adaptation program.

The deviation can be recoupled to the characteristic curve in a linear or non-linear manner. Such recoupling makes it possible to adapt the characteristic curve incrementally, closer and closer to the actual clutch behavior, at each measurement of the deviation. At the same time, the incremental adaptation also makes it possible to adapt changes in the clutch behavior that arise due to wear or aging.

Preferably, the predetermined value is quantitatively half the hysteresis width of the clutch characteristic curve. Since the clutch characteristic curve preferably falls between the two hysteresis branches, it is especially advantageous if only deviations from the characteristic curve that are greater than the hysteresis width are registered as errors and result in an adaptation of the clutch characteristic curve. In that case deviations that are smaller than half the hysteresis width may not be registered further.

Half the hysteresis width can then be preset as the value, or can be obtained through the measurements.

By preference, the comparison can consist in determining an adaptation error and in ascertaining whether the adaptation error is negative or positive, and depending on the mathematical sign of the error in incrementing and/or decrementing a counter, which is different for the procedure "engage clutch" than for the procedure "disengage clutch."

Through this statistical procedure it may be possible to dispense with determining the dead zone over half the hysteresis, and thus to achieve a good adaptation through an iterative process.

It is preferred if the counter for engaging the clutch is smaller than the negative of a certain threshold, and the counter for disengaging the clutch is greater as the threshold the dead zone is enlarged. If the counter for engaging the clutch is greater than a certain threshold and the counter for disengaging the clutch is smaller than the negative of the threshold, the dead zone is made smaller.

BRIEF DESCRIPTION OF THE DRAWINGS

The invention will now be explained further by way of example through two exemplary embodiments on the basis of the drawing.

The figures show the following.

DETAILED DESCRIPTION

Figure 1:
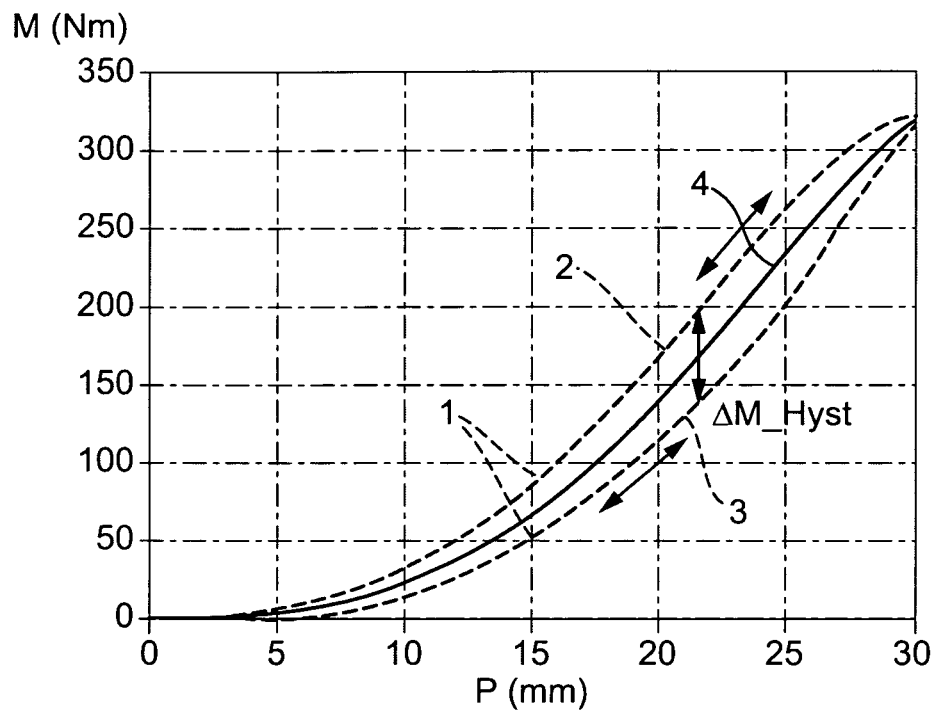
FIG. 1: a clutch torque adjusting path diagram.

The clutch behavior of a vehicle clutch is depicted in FIG. 1. The torque M transmissible by the clutch is plotted there over the position P of the clutch. Clutch characteristic curve 1 shows hysteresis here, with the two hysteresis branches 2 and 3. The one hysteresis branch 2 indicates the behavior of the clutch when the clutch is being disengaged, while the second hysteresis branch 3 is the behavior when the clutch is being engaged. The clutch characteristic curve 4, which is placed between the two hysteresis branches 2 and 3, is to be adapted to the hysteresis branches.

To adapt a clutch parameter KP, such as for example the maximum transmissible torque M, an adaptation error AF is determined. This adaptation error AF can be for example a torque error $\Delta M$, i.e., the difference between a measured torque and the torque obtained from the characteristic curve, or it can also be a rotational speed error $\Delta n$, as the difference between the measured and the estimated engine speed, due to the presence of a torque error. This adaptation error is recoupled in a straight line to the clutch parameter in accordance with the equation:

$$KP\_new = KP\_old - K1 * AF$$

where K1 represents a recoupling constant.

Figure 2:
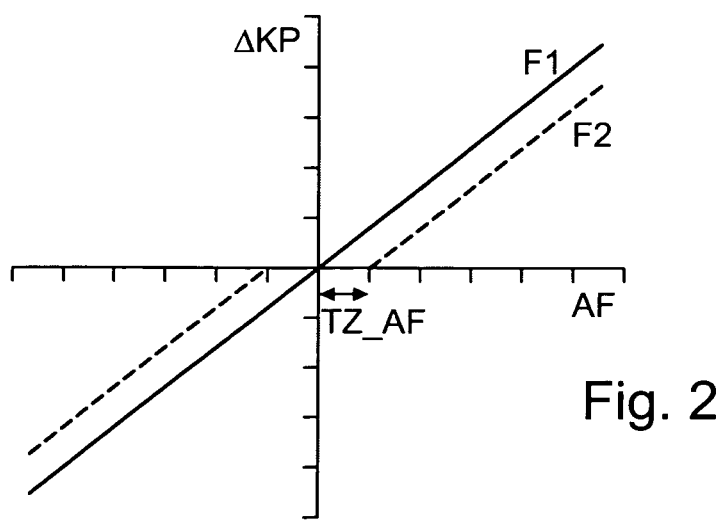
FIG. 2: a recoupling function for adaptive parameters.

The change in the clutch parameter $\Delta KP = F1(AF) = K1 * AF$ is depicted in FIG. 2. If such a recoupling is chosen, the adapted characteristic curve 4 approaches closer and closer to the current state. When the clutch is disengaged and engaged frequently, that produces a whole scatter band for the adapted characteristic curve, which lies between the hysteresis branches 2 and 3.

If a dead zone TZ_AF is now introduced into the recoupling function, which causes deviations that lie in this dead zone to be ignored or to be given much less attention than deviations that lie outside of the dead zone, the resulting scatter band for the characteristic curve becomes smaller. If one uses the torque error $\Delta M$ as the adaptation error and chooses as dead zone TZ_$\Delta M$ accordingly the torque hysteresis $\Delta M$_Hyst (FIG. 1) to produce $$TZ\_\Delta M = 0.5 * \Delta M\_Hyst$$

then one obtains as the result the aforementioned middle clutch characteristic curve 4. By enlarging the dead zone further, one again obtains a scatter band, which however is not completely covered over a long time. One then does not necessarily obtain the aforementioned middle clutch characteristic curve as the mean adapted characteristic curve.

It must be noted, however, that the torque hysteresis $\Delta M$_Hyst is normally not constant along the clutch characteristic curve. Accordingly, its value should be averaged along the clutch characteristic curve. The averaged torque hysteresis $\Delta M$_Hyst is identified as <$\Delta M$_Hyst>.

That yields the following as the ideal dead zone:

$$TZ\_\Delta M = 0.5 * <\Delta M\_Hyst>.$$

If the torque error $\Delta M$ is not used as the adaptation error, then an effective torque error $\Delta M_{eff}$ can be determined from the adaptation error:

$$\Delta M_{eff} = F3(AF)$$

Use of the inverse function $F3^{-1}$ yields the corresponding dead zone for the adaptation error AF:

$$TZ\_AF = 0.5 * F3^{-1}(\Delta M\_Hyst)$$

Furthermore, another method can also be used to determine the dead zone, in particular since the clutch hysteresis is not constant either over the life of the clutch nor over the series scatter.

The adaptation errors are statistically evaluated separately for the procedures "engage clutch" and "disengage clutch." In a simple design, a counter N (either $N_{engaged}$ for the process "engage clutch" or $N_{disengaged}$ for the process "disengage clutch") is incremented if the adaptation error is positive, or is decremented if the adaptation error is negative. Instead of the query as to whether the adaptation error is positive or negative, it is also possible to determine whether an error is greater than a certain threshold value or smaller than a certain negative threshold value.

If the two counters either $N_{disengaged}$ and $N_{engaged}$ have different mathematical signs, and if the counter values are statistically significant, then the dead zone can be adapted according to the following equation:

$$N_{engaged} < -N_{threshold} \text{ and}$$
$$N_{disengaged} > N_{threshold} => \text{increase } TZ\_AF, \text{ or}$$

$$N_{engaged} > N_{threshold} \text{ and } N_{disengaged} < -N_{threshold} => \text{reduce } TZ\_AF.$$

By using the adaptation algorithm, it is possible to dispense with the determination of the dependency between adaptation error and effective torque error $\Delta M_{eff}$ which may otherwise be necessary.

REFERENCE LABELS

1 hysteresis
2 hysteresis branch "disengage clutch"
3 hysteresis branch "engage clutch"
4 characteristic curve
M torque
P position of the clutch
AF adaptation error
$\Delta KP$ change in the clutch parameter
KP clutch parameter
TZ_AF dead zone

What is claimed is:

1. A method for adapting a clutch characteristic curve of an automated vehicle clutch, exhibiting hysteresis, comprising the following steps:
   providing a clutch characteristic curve having two hysteresis branches of the automated vehicle clutch;
   comparing at least one characteristic value obtained from the characteristic curve to a corresponding measured characteristic value, and
   adjusting, by an automated controller of the automated vehicle clutch, the clutch characteristic curve if the comparison shows there is a deviation between the at least one obtained characteristic value and corresponding measured characteristic value greater than half a hysteresis width of the clutch characteristic curve.

2. The method as recited in claim 1 wherein the characteristic value is a torque transmitted by the clutch.

3. The method as recited in claim 1 wherein the characteristic value is an engine rotation speed.

4. The method as recited in claim 1 wherein comparing the characteristic value includes determining the difference between the measured characteristic value and the characteristic value obtained from the characteristic curve.

5. The method as recited in claim 1 wherein the deviation is recoupled to the characteristic curve in a linear or non-linear manner.

6. The method as recited in claim 1 wherein half the hysteresis width is quantitatively half a hysteresis width of the clutch characteristic curve.

7. The method as recited in claim 1 wherein half the hysteresis width is half a mean hysteresis width of the clutch characteristic curve.

8. The method as recited in claim 1 wherein comparing the characteristic value includes determining an adaptation error, ascertaining whether the adaptation error is negative or positive, and incrementing and/or decrementing a counter which is different for the procedure "engage clutch" than for the procedure "disengage clutch", depending on whether the adaptation error is positive or negative.

9. The method as recited in claim 1 further comprising enlarging a size of a dead zone if the counter for engaging the clutch is smaller than the negative of a certain threshold and the counter for disengaging the clutch is greater than the threshold, or reducing a size of the dead zone if the counter for engaging the clutch is greater than a certain threshold and the counter for disengaging the clutch is smaller than the negative of the threshold.

10. The method as recited in claim 1 wherein the one of the two hysteresis branches indicates the behavior of the actual clutch when the actual clutch is being disengaged and the second of the two hysteresis branches indicates the behavior of the actual clutch when the clutch is being engaged.

* * * * *